United States Patent
Melquion et al.

[15] 3,654,030
[45] Apr. 4, 1972

[54] CONNECTING CABLE BETWEEN A CONTROL POST AND FLYING MISSILE

[72] Inventors: Henri Melquion, Joinville-Le-Pont; Emile Stauff, Versailles; Jean Guillot, Chatenay-Malabry, all of France

[73] Assignees: Electrofil, Sein; Nord-Aviation Societe Nationale de Constructions Aeronautiques, Paris, France

[22] Filed: July 16, 1965

[21] Appl. No.: 473,908

[30] Foreign Application Priority Data

July 16, 1964 France..................................981,949

[52] U.S. Cl..................................156/441, 57/16, 156/47, 157/51, 156/55, 174/113, 174/128
[51] Int. Cl..................................B32b 31/00, H01b 13/00
[58] Field of Search..............174/68, 113, 128, 116; 156/47, 156/49, 50, 51, 52, 53, 55, 56, 54, 441, 494; 57/3, 16

[56] References Cited

UNITED STATES PATENTS

| | | |
|---|---|---|
| 2,501,413 | 3/1950 | Schiappa..................................57/3 |
| 3,005,739 | 10/1961 | Lang et al..................................156/47 |
| 3,058,867 | 10/1962 | Plummer et al..........................174/68 |
| 3,067,569 | 12/1962 | Kelly..........................................156/47 |
| 3,163,711 | 12/1964 | Schindler..................................174/116 |

*Primary Examiner*—Samuel Feinberg
*Assistant Examiner*—H. A. Birmiel
*Attorney*—Karl W. Flocks

EXEMPLARY CLAIM

1. Installation for manufacturing a cable connecting a control post with a flying missile, said cable consisting of electric conducting wires assembled with sheathing threads, said wires and threads receiving a cover, which installation comprises:

at least one distributing and tension-equalizing device for the said threads and wires, grooved rollers arranged in a triangle on said distributing and tension-equalizing device and over which the said threads and wires pass, a pivoting lever secured to the spindle of one of said rollers, a loaded spring connecting a fixed point on said device with said pivoting lever, whereby the said roller is resiliently mounted to enable the tensions of the said threads and wires to be adjusted.

5 Claims, 6 Drawing Figures

Patented April 4, 1972

Inventors
Henri Melquion
Emile Stauff
Jean Guillot
By
Karen W. Flocks
Attorney

Patented April 4, 1972

Inventors
Henri Melquion
Emile Stauff
Jean Guillot
By
Karl W. Flocks
Attorney.

Patented April 4, 1972  3,654,030

Inventors
Henri Melguion
Emile Stauff
Jean Guillot
By
Karl W. Flocks
Attorney

CONNECTING CABLE BETWEEN A CONTROL POST AND FLYING MISSILE

It is known to provide guide cables for missiles formed of parallel electric conductors assembled with a sheathing of strong fibres arranged parallel to the conductors, said cables providing electric connections between the flying missile and the control post.

It has often been found, when unwinding the guide cable, especially for high unwinding speeds, that the electric conductors become ruptured without mechanical rupture of the sheathing.

The applicants have found that one of the reasons for the rupture of the conductors resides in the fact that the continuous filaments or threads forming the sheathing are differently stretched under the effect of traction, due to lack of uniformity in the initial tensions of these filaments and to a lack of uniformity in their distribution.

The present invention obviates this drawback and relates to a method for equalizing the tensions of the sheathing filaments and for suitably distributing them prior to the cord-binding thereof. The mechanical tensions of the electric conductors of the cable are likewise equalized.

The rates between the tension of the sheathing filaments and that of the electric conductors is so calculated that the tension of the conductors is slightly lower.

The idea of rendering the filaments uniform in their distribution, which is a corollary of their uniformity in tension, has lead to the application of this principle to the obtainment of a new fully twisted cable which has so far never been applied to this field of use.

The cable thus obtained can be covered or lapped, in which case a binding operation is no longer necessary.

This invention also relates to the means for obtaining this uniformity of tensions and distribution of the sheathing filaments as well as of the electric conductor wires.

These means comprise, in particular, a combined distributing and tension equalizing device constituted by grooved rollers preferably arranged in a triangle, one of these rollers being resiliently mounted. This resilient mounting of the intermediary roller enables the tensions to be adjusted when one or several filaments are lagging in relation to the others.

The amount of the selected tension can be altered by varying the load on a spring connecting a fixed point to a pivoting lever secured to the spindle of the resiliently mounted roller.

All these rollers are mounted on bearings and they comprise as many grooves as there are filaments whose tension and distribution are to be rendered uniform.

The rollers of the distributing and equalizing device can be made of metal when continuous filaments or threads of synthetic, mineral or vegetable origin are to be equalized in tension.

The rollers for equalizing the electric metal conductors are preferably made of a synthetic material such as "Nylon."

A distributing and equalizing device according to the invention can be applied to the winding of assemblies consisting of at least two continuous filaments or threads of synthetic, mineral or vegetable origin.

These pre-wound assemblies whose tension has been equalized can advantageously be applied to the production of a twisted guide cable.

The cable can be twisted by means of a conventional stranding machine provided with advantage with a tension regulating device. It is thus possible to provide a simultaneous twist of both conductors about a central core, and of the sheathing filaments about the thus assembled conductors.

When the sheathing consists of continuous parallel filaments, the filaments, after equalization of their tensions and after uniform distribution, are introduced into a collector comprising as many tubes as there are filaments so as to maintain this filament distribution until the binding operation is carried out at the outlet of the collector.

Other features and advantages of the present invention will become apparent from the following description taken in conjunction with the accompanying drawings, in which.

Applicants have found that it is indispensable to provide an equal tension between the sheathing filaments and the electric conductors and a proper distribution thereof in order to obtain a suitable cable for connecting a control post to a missile in flight.

This equalization in the tensions and this uniformity in the distribution of the filaments or threads has, furthermore, lead the applicants to apply this principle to the production of a twisted connecting cable.

This invention therefore relates both to cables comprising a sheathing made up of parallel continuous filaments or threads, and to twisted cables, both types of cables being very substantially improved as a result of the equalization of the tensions between said filaments or threads and their uniform distribution.

The invention also relates to the means for obtaining both said results, said means comprising an equalizing and distributing device.

Figure 1:
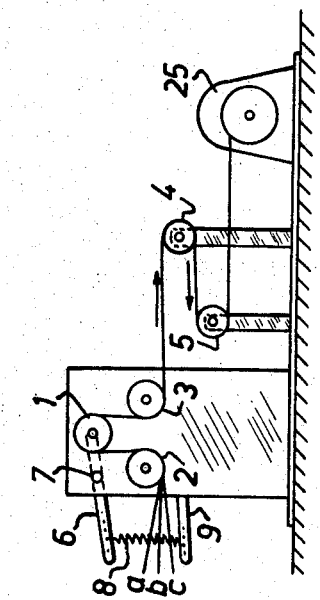
FIG. 1 is a side elevation of a distributor and tension equalizer device for continuous filaments, in accordance with the invention.

This equalizing and distributing device comprises grooved rollers preferably in a triangular arrangement, in FIG. 1 the upper intermediary roller 1 being resiliently mounted and the other two 2 and 3 being mounted on fixed spindles.

These rollers exhibit smoothly polished grooves which have equal depths and are equally spaced and correspond in number to the number of filaments whose tensions are to be equalized and distribution rendered uniform.

FIG. 1 shows an equalizing and distributing device which receives three continuous filaments or threads $a$, $b$, $c$. This device is completed by the provision of two further rollers 4 and 5 mounted on fixed spindles, similar to the rollers 2 and 3.

All these rollers are mounted on ball bearings and the spindle of the upper roller 1 is mounted at one of the ends of a lever 6 pivoting about a pivot 7. At the other end of this lever a spring 8 can be secured at various points. This spring 8 connects the lever 6 to a fixed element, preferably in the form of a small rod 9 also comprising several attaching points for the spring.

Figures 2, 3:
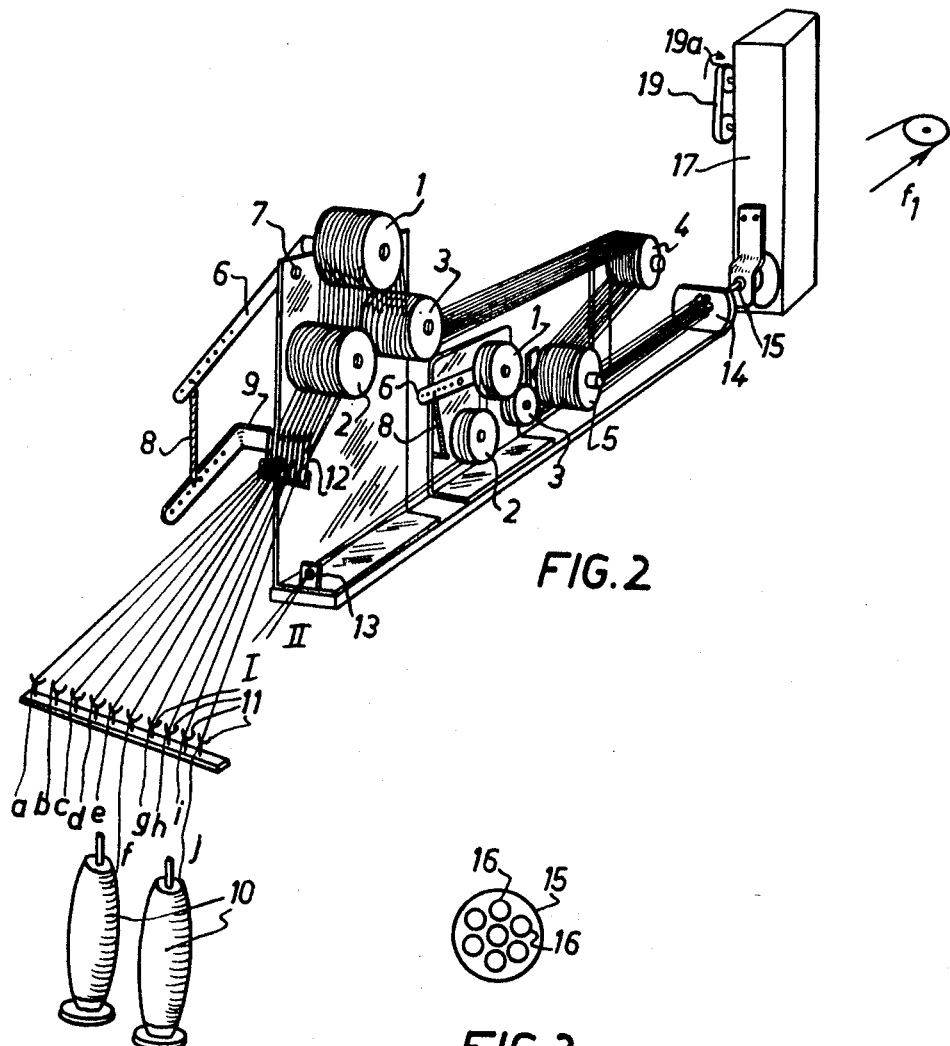
FIG. 2 is a perspective view of two devices of this type suitable for continuous sheathing filaments and for two electric conductors to which they are associated.
FIG. 3 is an end view, on a very enlarged scale, of a filament collector comprising as many tubes as there are filaments, including a tube for the passage of the two enamelled electric conductors.

FIG. 2 also shows a tension equalizing and filament distributing device. It enables both the above conditions of tension and distribution to be obtained for 10 continuous filaments or threads ($a$ to $j$) issuing from cops 10. Before reaching the distributor, the filaments are subjected to a preliminary tension by means of lyre devices and pass through a comb 12.

In the vicinity of this distributor comprising 10 groves is a second distributor having two-groove rollers for equalizing the tensions between two enamelled electric conductors I and II.

Before reaching their tension equalizing and distributing device, both conductors pass through a guide lead 13, preferably made of alumina.

The sheet of continuous sheathing filaments, which are equally tensioned and uniformly distributed, as well as the two conductors I and II, pass through alumina beads 14 arranged in such a manner that both conductors pass through a central bead and the sheet of sheathing filaments passes through peripheral beads.

The correctly distributed sheathing filaments and both conductors then pass through a collector 15 comprising as many separate tubes 16 as there are beads 14. In the case as illustrated in FIG. 2 there are six peripheral beads and therefore six peripheral tubes. Some beads and tubes may accommodate more than one sheathing filament each when the number of filaments is higher than six. Of course, in such case, it is also possible to provide a number of beads and tubes corresponding to the number of filaments.

The collector is arranged in a conventional wire-covering device 17 provided with a device 19 which exerts a traction in the direction of the arrow f1, the pulley 19a being preferably the driving pulley.

Figure 4:
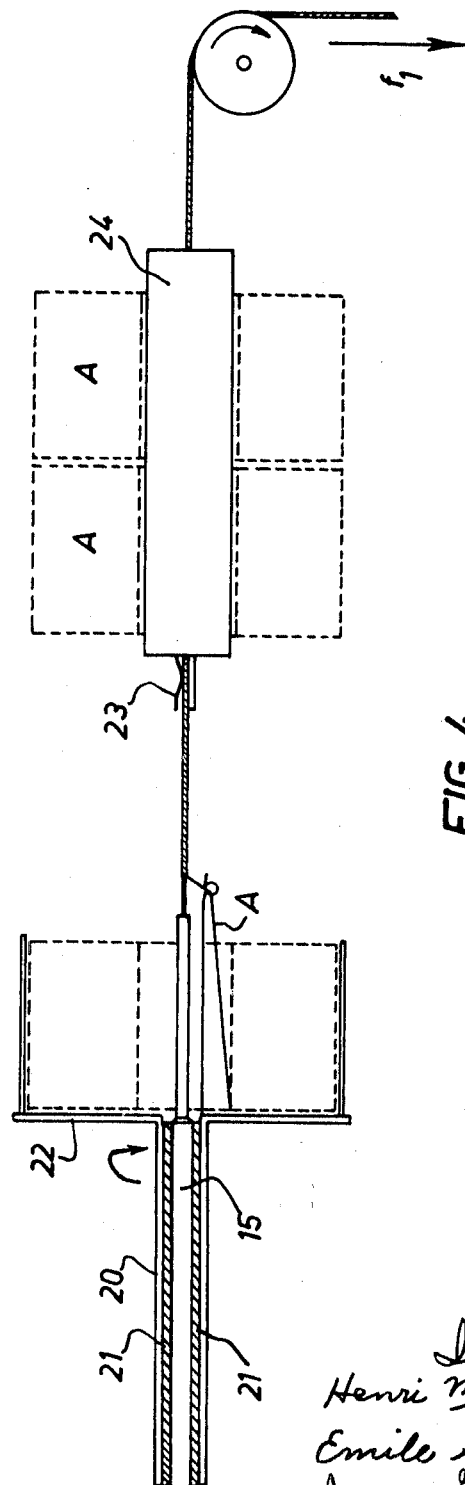
FIG. 4 shows this same collector introduced into a wire covering or lapping device shown very diagrammatically.

The connecting cable which issues from the apparatus shown in FIG. 2 is a two-conductor cable with a sheathing of continuous parallel filaments or threads. This arrangement requires a cord-binding operation rather than a simple covering operation to hold the assembly together. This binding action is obtained by means of the conventional wire-covering machine 17 modified in such a manner that the inner rotating sleeve 20 (FIG. 4) thereof receives the collector 15 provided with inner tubes 16 and having the form of a central perforated spindle. Bearings 21 are provided between the collector 15 and the tube 20.

The lapping thread A (or more exactly the binding thread) is spiral wound about the assembly of sheathing filaments and central conductors, in a known manner.

The lapping plate 22 which receives the lapping spool 2 is followed by a smoothing device 23 and by a supply of spools 24.

As described above, the distributor according to FIG. 1 enables three different continuous filaments or threads a, b, c to be rendered uniform in tension and distribution. It is thus possible to assemble three continuous sheathing filaments which are immediately wound on a bobbin-winder 25. The bobbins thus obtained can be applied to the manufacture of a twisted connecting cable according to the invention. It is to be understood that use can be made of bobbins comprising a single filament or thread, the essential condition being that the tension of the filament shall be the same from one bobbin to the other, whether the filament or thread is unitary or comprises an assembly of two, three or more filaments.

Figure 5:
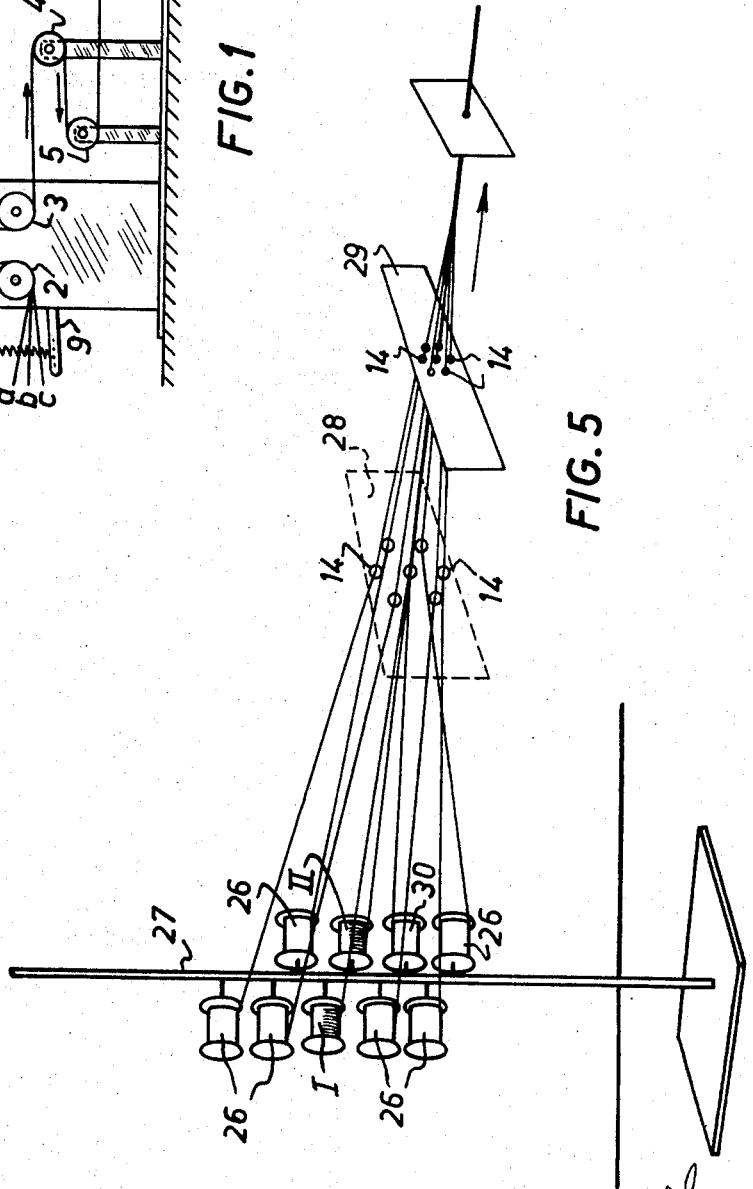
FIG. 5 shows, in perspective, the manner in which the sheathing filaments and the conductors are formed into a twisted cable, between a creel and a twisting or stranding device, not shown in this figure.

Several of these bobbins 26 provided in known manner with counterweights (not shown for the sake of clearness) and each comprising an assembly of three filaments having equal tensions, can be arranged on a creel 27 disposed opposite a twisting device comprising two guides 28 and 29 having alumina beads 14, as shown in FIG. 5.

The beads of the second guide are much more concentrated or closer together around the central bead than the beads of the first guide. A first twist occurs at the outlet of the first guide, namely a twist on the two conducting wires I and II about a filament or thread 30 constituting a central core. This central core filament or thread 30 is preferably of the same nature as the sheathing filaments.

The second twist occurs at the outlet of the second guide and is imparted to the continuous sheathing filaments or threads which become twisted around the assembly of the two conductors I and II with the central core.

Figure 6:
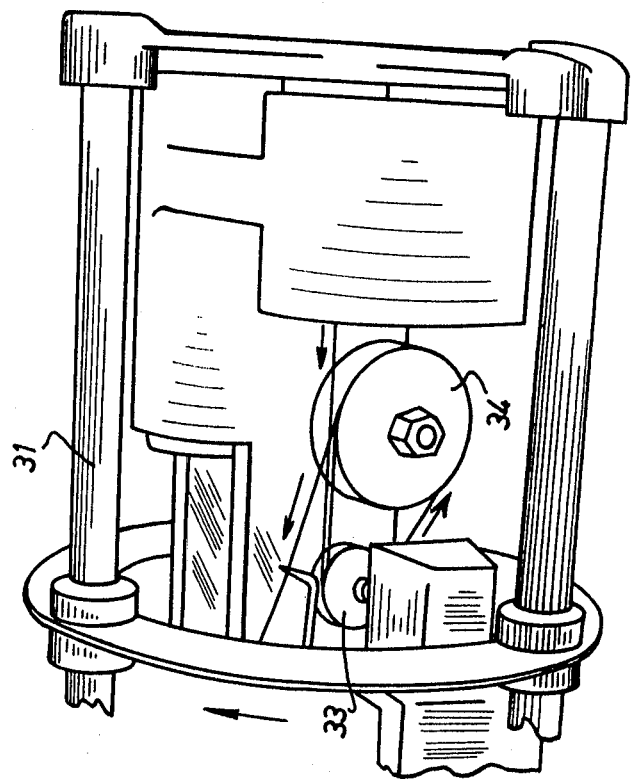
FIG. 6 is a partial perspective view of the twisting machine provided with a tension regulator according to the invention.
Figure 6:
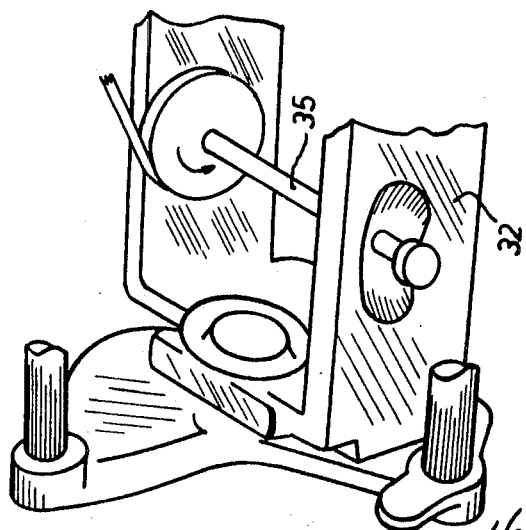

However both twists are produced simultaneously under the action of the twisting or stranding device not shown in FIG. 5 but partially visible in perspective in FIG. 6.

In said FIG. 6, the rotating twist-imparting cage 31 and the loaded winding cradle 32 are shown.

In accordance with the invention, the cradle is provided with a tension regulating device comprising two pulleys 33 and 34 whereby the twisted cable can be suitably drawn on to the bobbin-frame 35.

The bobbins thus obtained are then directed to the covering device (FIG. 4) where the cable is suitably covered.

As can be seen from the foregoing, the basic idea of the invention is to provide an equal tension between the sheathing filaments or threads and the conducting wires, and a uniform distribution thereof whether they be in parallel or twisted.

The tension is calculated prior to the operation, by hooking on the springs 8 differently between the levers 6 and the rods 9 of the equalizing and distributing devices, said springs being suitably loaded according to needs.

In any case, the tension of the electric conductors is chosen slightly less than that of the sheathing filaments.

According to the invention, use may be made of any kind of sheathing filaments or threads: synthetic, mineral or vegetable. For example, use can advantageously be made of continuous glass filaments (such as those sold under the trade number of "Silionne.")

After the covering or binding operation, the connecting cable obtained is suitably varnished and baked in accordance with a predetermined program.

Generally, the above description has only been made in an explanatory manner without any intention to limit the invention and alterations can be made therein without falling outside its scope.

We claim:

1. Installation for manufacturing a cable connecting a control post with a flying missile, said cable consisting of electric conducting wires assembled with sheathing threads, said wires and threads receiving a cover, which installation comprises:
    at least one distributing and tension-equalizing device for the said threads and wires,
    grooved rollers arranged in a triangle on said distributing and tension-equalizing device and over which the said threads and wires pass,
    a pivoting lever secured to the spindle of one of said rollers,
    a loaded spring connecting a fixed point on said device with said pivoting lever, whereby the said roller is resiliently mounted to enable the tensions of the said threads and wires to be adjusted.

2. Installation for manufacturing a cable connecting a control post with a flying missile, said cable consisting of electric conducting wires assembled with sheathing threads, said wires and threads receiving a cover, which installation comprises:
    at least one distributing and tension-equalizing device for the said threads and wires,
    grooved rollers arranged in a triangle and mounted on antifriction bearings in said distributing and tension-equalizing device, and over which the said threads and wires pass, said rollers comprising as many grooves as there are threads and wires to be uniformly distributed and rendered equal in tension.
    a pivoting lever secured to the spindle of one of said rollers,
    a loaded spring connecting a fixed point on said device with said pivoting lever, whereby the said roller is resiliently mounted to enable the tensions of the said threads and wires to be adjusted.

3. Installation for manufacturing a cable connecting a control post with a flying missile, said cable consisting of electric conducting wires assembled with sheathing threads, said wires and threads receiving a cover, which installation comprises:
    at least one distributing and tension-equalizing device for the said threads and wires,
    grooved rollers arranged in a triangle and mounted on antifriction bearings in said distributing and tension equalizing device, and over which the said threads and wires pass, said rollers comprising as many grooves as there are threads and wires to be uniformly distributed and rendered equal in tension, the rollers for the sheathing threads being made of metal and the rollers for the electric conducting wires being made of a plastic material,
    a pivoting lever secured to the spindle of one of said rollers,
    a loaded spring connecting a fixed point on said device with said pivoting lever, whereby the said roller is resiliently mounted to enable the tensions of the said threads and wires to be adjusted.

4. Installation for manufacturing a cable connecting a control post with a flying missile, said cable consisting of electric conducting wires assembled with parallel sheathing threads, said wires and threads receiving a cover, which installation comprises:

at least one distributing and tension-equalizing device for the said threads and wires, grooved rollers arranged in a triangle on said distributing and tension-equalizing device and over which the said threads and wires pass, one of said rollers being resiliently mounted to enable the tensions to be adjusted when one or several of the above threads are lagging in relation to the others.

a wire-covering device with an inner rotary sleeve, a collector comprising as many tubes as there are sheathing threads and electric wires so that said threads and wires retain their distribution until the covering operation takes place at the outlet of said collector by means of said wire-covering device whose innner rotary sleeve receives said collector.

5. Installation for manufacturing a fully stranded cable connecting a control post with a flying missile, said cable consisting of electric conducting wires assembled with sheathing threads, said wires and threads receiving a cover, which installation comprises:

at least one distributing and tension-equalizing device for groups of sheathing threads, groove rollers arranged in a triangle on said distributing and tension-equalizing device and over which the said threads and wires pass, one of said rollers being resiliently mounted to enable the tensions to be adjusted when one or several of the above threads are lagging in relation to the others.

a bobbin-winder making bobbins of said tension-equalized groups of sheathing threads, a creel receiving said bobbins, a twisting device drawing said groups of sheathing threads from said bobbins on the creel, a tension regulator on said twisting device, two guides provided on said twisting device, said guides receiving said groups of tension-equalized sheathing threads as well as at least two electric wires and a central core, the twisting of said electric wires around said central core and the twisting of the groups of sheathing threads around the assembly of electric wires and central core being simultaneously carried out by the twisting device through the medium of said guides.

* * * * *